W. C. HOWARD.
Rice-Hulling Machine.
No. 203,917. Patented May 21, 1878.
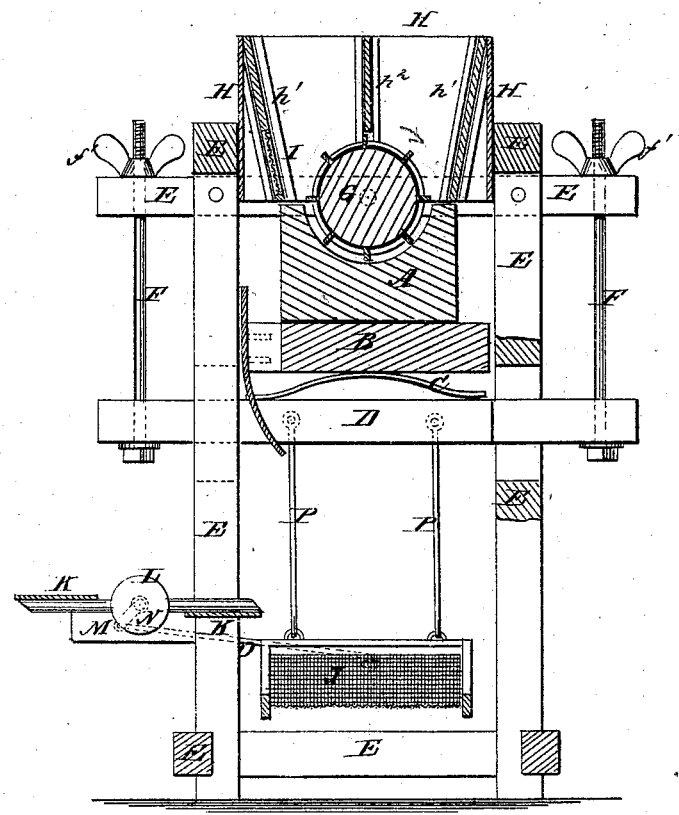
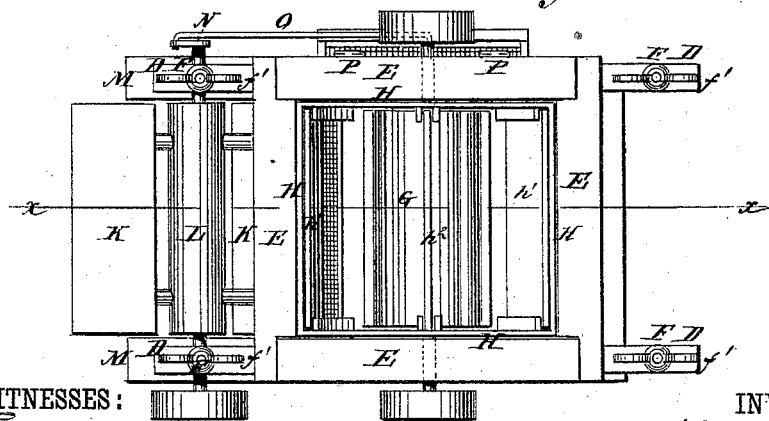
WITNESSES:
Francis McArdle
C. Sedgwick
INVENTOR:
W. C. Howard
BY [signature]
ATTORNEYS.

UNITED STATES PATENT OFFICE.

WILLIAM C. HOWARD, OF GRAHAMVILLE, SOUTH CAROLINA.

IMPROVEMENT IN RICE-HULLING MACHINES.

Specification forming part of Letters Patent No. 203,917, dated May 21, 1878; application filed December 15, 1877.

*To all whom it may concern:*

Be it known that I, WILLIAM CARR HOWARD, of Grahamville, in the county of Beaufort and State of South Carolina, have invented a new and useful Improvement in Rice-Hulling Machines, of which the following is a specification:

Figure 1 is a vertical cross-section of my improved machine, taken through the line $x\,x$, Fig. 2. Fig. 2 is a top view of the same.

Similar letters of reference indicate corresponding parts.

The object of this invention is to furnish an improved machine for hulling rice which shall be simple in construction, inexpensive in manufacture, convenient in use, and effective in operation, designed especially for family use, but which may be made of any desired size and capacity.

The invention will first be described in connection with the drawing, and then pointed out in the claims.

A is a stone of convenient size, and which has a semi-cylindrical cavity formed in its upper side, as shown in Fig. 1. The stone A rests upon, and is bolted or otherwise secured to, a frame or platform, B, the ends of which rest upon and are secured to springs C. The springs C rest upon the bars D, and are kept in place by their ends entering the slots in the posts of the frame E through which the said bars D pass.

The ends of the bars D project, and through them are passed the rods F, which also pass through the projecting ends of the top cross-bars of the frame E, and have hand-nuts $f'$ screwed upon their ends, so that the stone A may be adjusted as required by adjusting the nuts $f'$ upon the rods F.

G is a wooden or iron cylinder placed in the cavity of the stone A, and the journals of which revolve in bearings in the top bars of the frame E. The journals of the cylinder G may have cranks or pulleys attached to them, according as the machine is to be worked by hand or power.

The cylinder G is covered with rubber cloth and then with leather, and strips of leather or rubber about an inch wide are inserted edgewise in said cylinder, about two inches apart, so that they can be moved out as they wear, as they are the only part much subject to wear. These strips revolve the kernels of rice against the concave surface of the stone A, so as to remove the hulls very soon.

H is the hopper, which covers the cylinder G, rests upon the stone A, and has the lower edges of its sides so formed as to fit into the end parts of the cavity of the said stone A. The hopper H is made longer than the width of the stone A, and is provided with end slides $h^1$, which slide in grooves in the sides of the said hopper, and their lower edges rest upon the upper side of the stone A, so that the rice may be allowed to flow out by raising the said slides.

In grooves in the middle part of the sides of the hopper H is placed the central slide $h^2$, the lower edge of which rests near the top cylinder G, so that the rice may feed down to only one side of the said cylinder G.

In the lower part of one of the end slides $h^1$ is formed an opening, in which is secured wire-gauze I to allow the rice-flour to escape. When the rice is hulled the slide $h^1$ I is raised and the rice is allowed to fall upon the screen J, down which it runs to a receiver, while the rice-flour falls through the said screen, and is thus separated from the rice.

The rice, while falling to the screen J, is exposed to a blast of air from the fans K, the journals of the shaft L of which revolve in bearings in arms or brackets M, attached to the frame E.

To one of the journals of the fan-shaft L is attached a crank or pulley, according as it is to be worked by hand or power. To the other journal of the fan-shaft L is attached, or upon it is formed, a crank, N, to which is pivoted the end of a rod, O, the other end of which is connected with the screen J, to agitate it, and thus prevent the rice from lodging upon it.

The screen J is suspended, by pivoted rods P, from the frame E, so that it may be agitated easily.

Having thus described my invention, I claim as new and desire to secure by Letters Patent—

1. The combination, with the stone A and cylinder G, of the hopper H, resting on the stone, and having one of the slides $h^1$ provided with wire-gauze I, as and for the purpose set forth.

2. The hopper H, provided with the end slides $h^1$, the central slide $h^2$, and the wire-gauze I, in combination with the cylinder G and the concaved stone A, substantially as herein shown and described.

WILLIAM CARR HOWARD.

Witnesses:
JOS. DEWEES, M. D.,
H. D. BURNET.